(12) United States Patent
Schwingshandl et al.

(10) Patent No.: US 6,471,043 B2
(45) Date of Patent: Oct. 29, 2002

(54) ROLLER CONVEYOR

(75) Inventors: Thomas Schwingshandl, Pasching; Erich Schlenkrich, Linz; Thomas Kriechbaum, Grieskirchen, all of (AT); Christoph Wolkerstorfer, Niederwaldkirchen (AU)

(73) Assignee: TGW Transportgeräte Ges. m. b. H., Wels (AU)

( * ) Notice: Subject to any disclaimer, the term of this patent is extended or adjusted under 35 U.S.C. 154(b) by 0 days.

(21) Appl. No.: 09/799,453

(22) Filed: Mar. 5, 2001

(65) Prior Publication Data
US 2002/0008007 A1 Jan. 24, 2002

(30) Foreign Application Priority Data
Mar. 6, 2000 (AT) ............................................. 150/00 U

(51) Int. Cl.$^7$ ............................................. B65G 13/06
(52) U.S. Cl. .............................. 198/781.06; 198/781.08
(58) Field of Search ........................ 198/781.06, 781.08

(56) References Cited

U.S. PATENT DOCUMENTS

| | | | |
|---|---|---|---|
| 3,713,521 A | | 1/1973 | Moritake |
| 3,840,110 A | * | 10/1974 | Molt et al. .............. 198/127 R |
| 3,961,700 A | * | 6/1976 | Fleischauer ............. 198/127 R |
| 4,103,769 A | * | 8/1978 | Jorgensen .................... 198/781 |
| 4,562,920 A | * | 1/1986 | Jaffre ......................... 198/781 |
| 4,974,723 A | * | 12/1990 | Toye .......................... 198/781 |
| 5,129,507 A | * | 7/1992 | Maeda et al. ............... 198/781 |
| 6,206,181 B1 | * | 3/2001 | Syverson .................... 198/788 |

FOREIGN PATENT DOCUMENTS

| | | |
|---|---|---|
| EP | 0 446 992 | 6/1994 |
| EP | 0 586 624 | 9/1996 |
| JP | 07149412 | 6/1995 |

* cited by examiner

Primary Examiner—Douglas Hess
(74) Attorney, Agent, or Firm—Collard & Roe, P.C.

(57) ABSTRACT

A roller conveyor with a plurality of rollers (3, 6, 13) which are held in a frame (2), which rollers are assigned to several sections (4), and a drivable and brakable roller (13) is assigned to each section (4) which is coupled with the other rollers (3) of the same section (4). In order to enable a simple arrangement, it is provided that the drivable and brakeable rollers (13) are each held on a fixed axle (15) on which a drive roller (6) is also held and which can be coupled with the drivable and breakable roller (13) by way of an electromecanical clutch (18', 23'), which roller on its part is provided with an electromechanical braking device (18, 23).

5 Claims, 7 Drawing Sheets

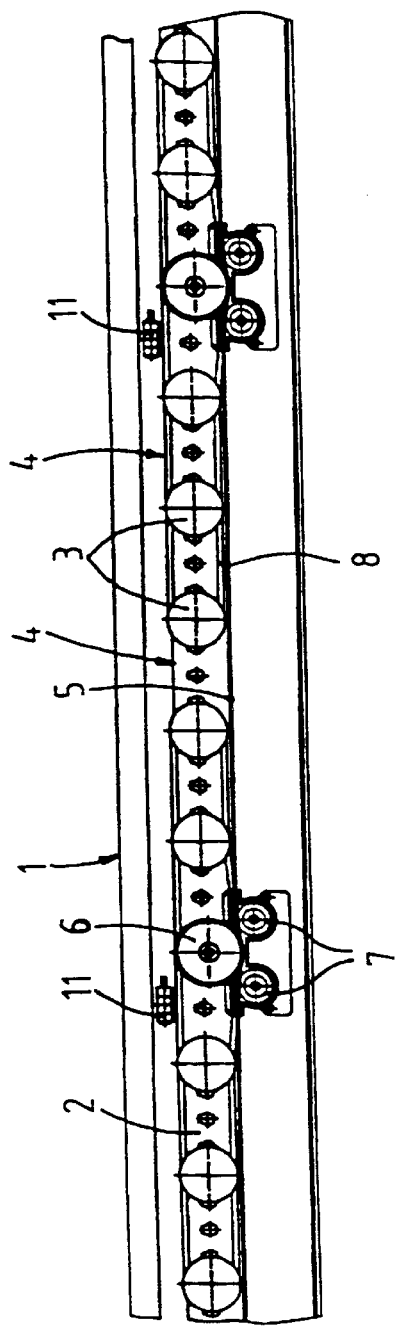
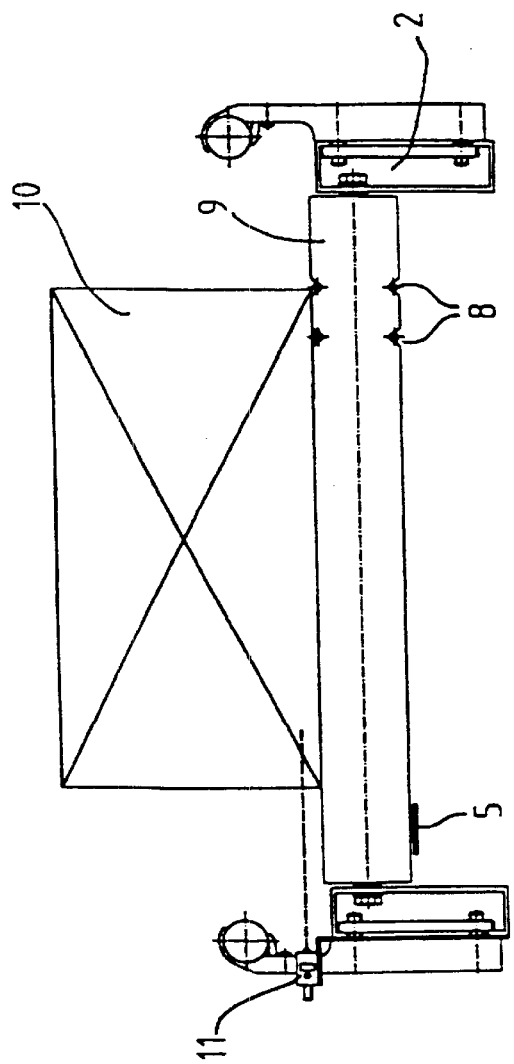

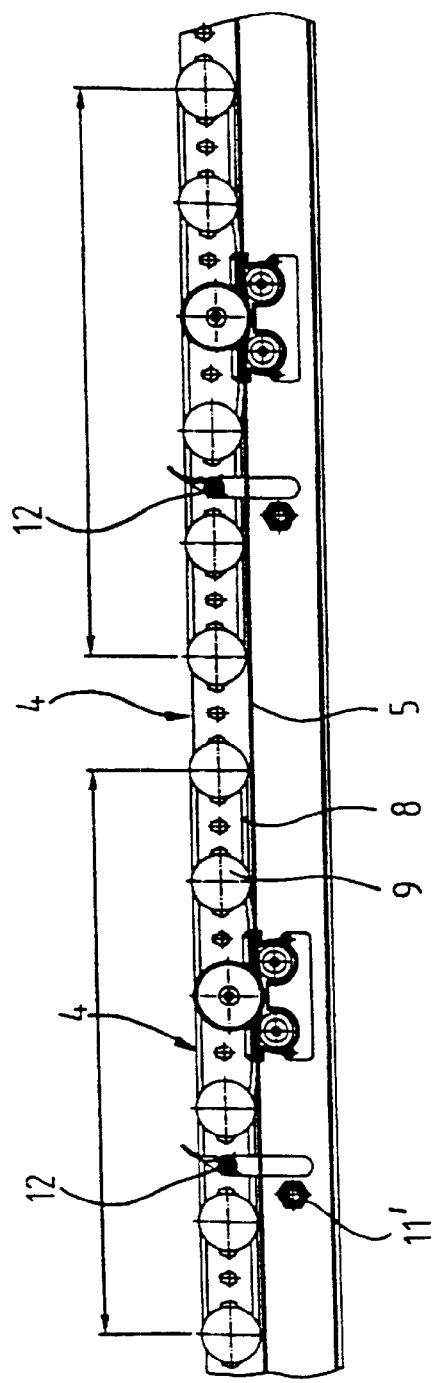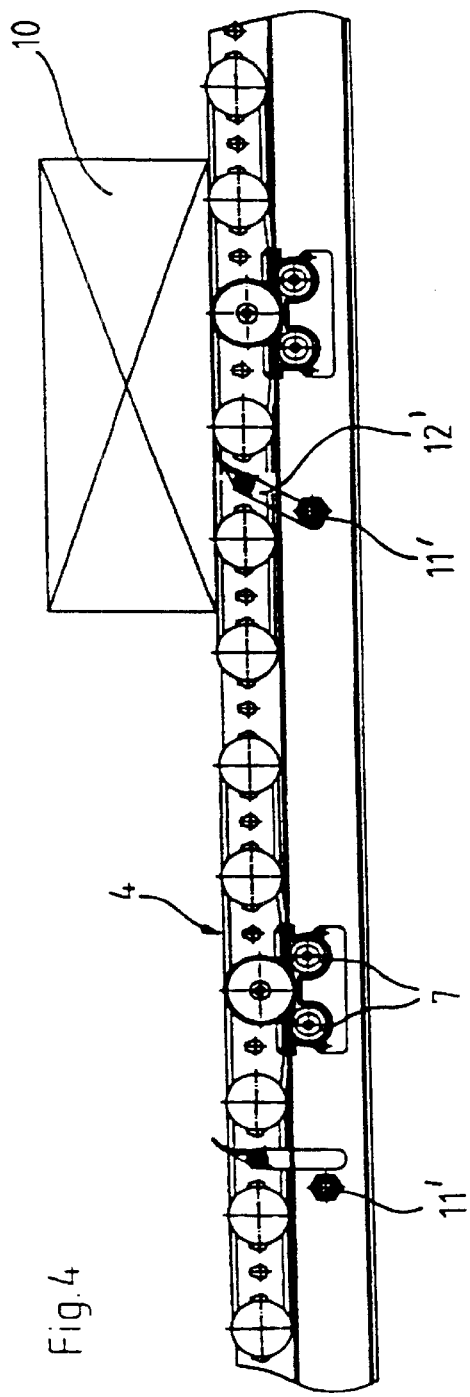

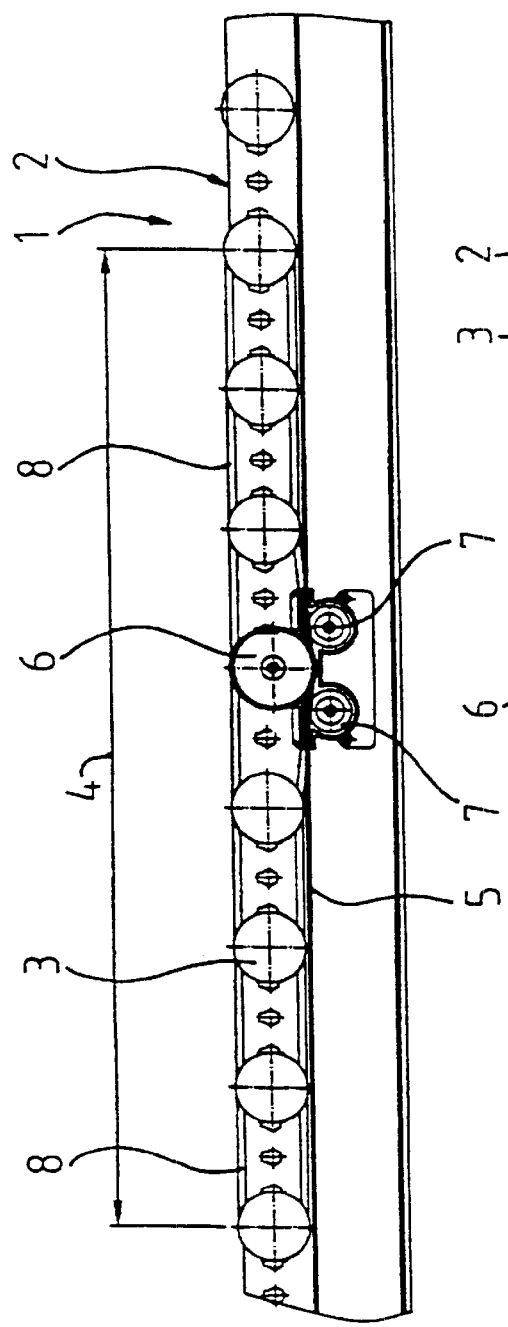

ROLLER CONVEYOR

The invention relates to a roller conveyor.

Accumulating roller conveyors are often used for the pressureless storage and conveyance of piece goods and are provided with rotatably held support rollers which are combined into groups of rollers, with a drivable and brakable roller being provided in each group of rollers.

A roller conveyor of the kind mentioned above is known from EP 0 586 624 B1. In this conveyor, a motor roller is provided in each group of rollers in which an electromotor with a planetary gear is provided. Each of the motor rollers which is each assigned to one group of rollers can be driven individually.

This leads to the disadvantage of a relatively high complexity in the installation and circuitry. Relatively high motor currents are also obtained during operation. Moreover, said motor rollers cannot be arrested and the braking moment that can be achieved with such a motor roller is substantially defined by the planetary gear.

A further roller conveyor has become known from EP 0446 992 B1. It describes a roller drive device in which the drive and the arresting of the drivable and brakable roller is performed exclusively by way of pneumatically actuatable elements which are arranged within the roller.

This solution leads to the disadvantage of a relatively high complexity of installation and circuitry which is caused by the pneumatic elements. Moreover, this roller conveyor requires a high amount of energy and produces a considerable level of noise during the switching of the pneumatic elements.

It is the object of the present invention to avoid such disadvantages and to provide a roller conveyor of the kind mentioned above which is characterized by a simple arrangement.

This is achieved in accordance with the invention by a roller conveyor comprising a frame, several sections of rollers held in the frame; each section comprising a plurality of support rollers, a drivable and brakable roller coupled to the support rollers, and a drive roller; a common axle rotatably supporting the drive roller and the drivable and brakable roller; a first switchable electromechanical clutch connecting the drivable and brakable roller to the drive roller; and a second switchable electromechanical clutch connecting the drivable and brakable roller to a braking drive.

The proposed measures lead to the advantage that the drivable and brakable roller of each group of rollers can be coupled with the drive roller on the one hand by way of simple electromagnets and can be braked and arrested on the other hand by way of a further electromagnet.

The installation effort is relatively low because it is merely necessary to lay relatively small dimensioned electric lines and it is possible to omit pneumatic lines and accumulating storages.

Preferably, the first electro mechanical clutch comprises a ring magnet which is held non-rotationally on the axle and magnetizes the drive roller, a friction lining on a side of the drive roller facing the drivable and brakable roller, and an armature non-rotationally connected to the drivable and brakable roller and held axially displaceably thereon for contact with the friction lining. Because the ring magnet is held in a stationary manner, it can be supplied via connecting lines which are guided along the axis for example. The magnetic flux from the pole faces of the ring magnet to the armature is conducted via the magnetizable ring. A high efficiency of the ring magnet is thus achieved.

The second electromechanical clutch preferably comprises a ring magnet which is held non-rotationally on the axle and has a pole face provided with a friction lining, and an armature non-rotationally connected to the drivable and brakable roller and held axially displaceably thereon. This allows keeping the ring magnet stationary and a simple connection of the ring magnet is thus also possible.

If a common revolving drive belt drives the drive rollers of the several sections, all rollers cane be driven with a single drive.

Preferably, belts operatively connect the drivable and brakable roller of each section of rollers with the support rollers thereof. This has the advantage of a very simple coupling of the rollers of each section of rollers with the associated drivable and brakable roller.

The invention is now explained in closer detail by reference to the enclosed drawing wherein:

FIG. 1 schematically shows a sectional view of a roller conveyor in accordance with the invention;

FIG. 2 shows a cross-sectional view through the roller conveyor according to FIG. 1;

FIG. 3 schematically shows a sectional view of a further embodiment of a roller conveyor according to the invention;

FIG. 4 schematically shows a sectional view of the further embodiment of a roller conveyor in accordance with the invention according to FIG. 3 with a pressed switching flap;

FIG. 5 schematically shows a longitudinal sectional view through an accumulating section in the direction towards the drive belt of a roller conveyor in accordance with the invention;

FIG. 6 shows a n enlarged sectional view of FIG. 5;

Figure 7:
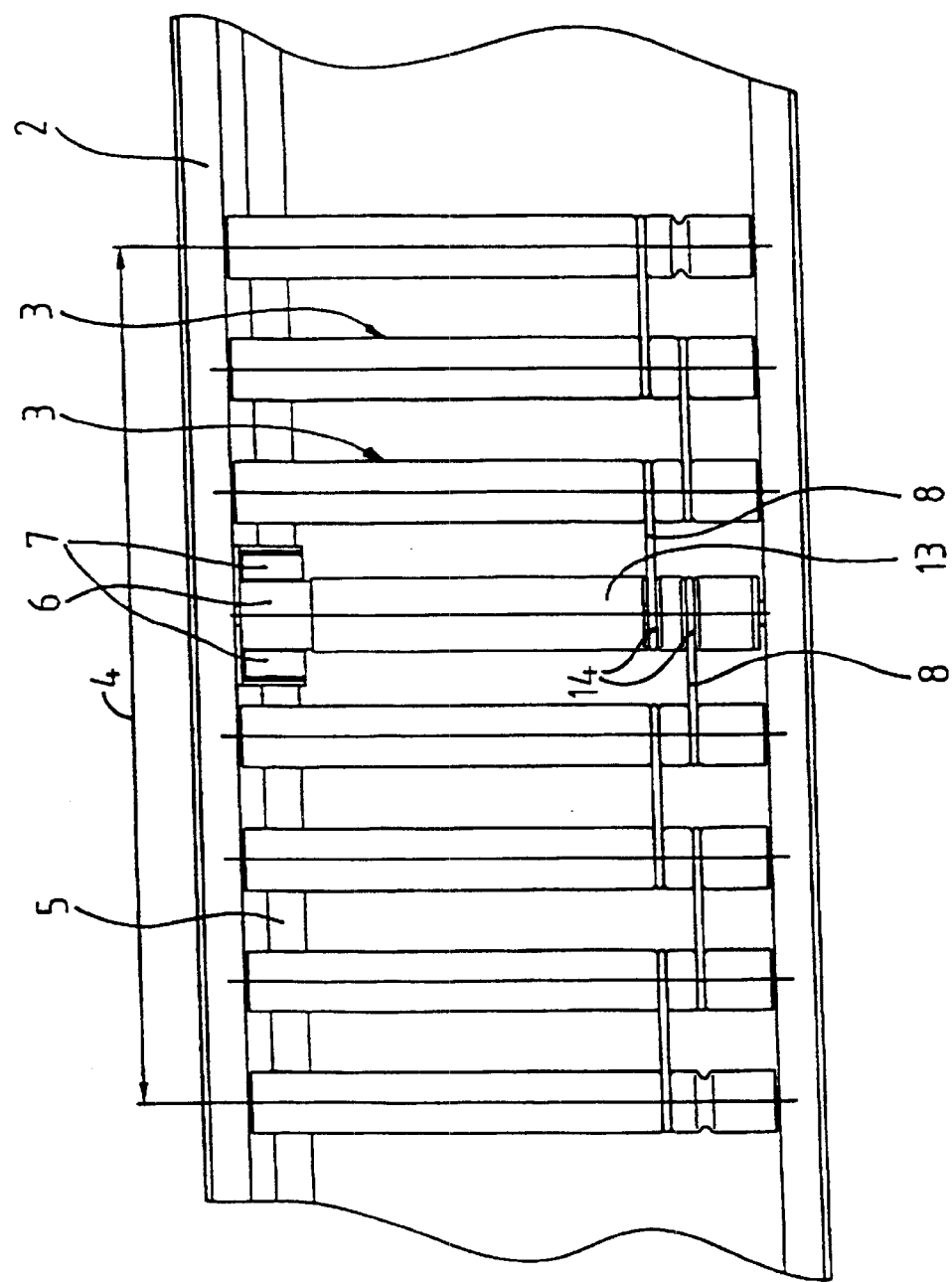
FIG. 7 shows a top view of an accumulating section with a drivable and brakable roller.

FIG. 1 shows a sectional view of a roller conveyor 1 in accordance with the invention. It is provided with a plurality of rollers 3 which are held in the frame 2, which rollers are subdivided into several sections 4.

A revolving belt 5 is provided for the drive, which belt is pressed in the zone of the drive rollers 6 by means of two press rollers 7 against the same.

As will be explained below, the drive roller 6 of each section 4 can be engaged with a drivable and brakable roller 13. Said drivable and brakable roller 13 is operatively connected by way of revolving belts 8 with support rollers 9 on which piece goods 10 can be conveyed.

In the embodiment in accordance with FIG. 1 and 2, optical sensors 11 are held in the frame 2, which sensors detect the piece goods 10 and send control signals to control devices (not shown) which, as will be explained below in closer detail, control coupling and braking devices of the drivable and brakable rollers 13.

The embodiment according to FIGS. 2 and 3 differs from that of FIGS. 1 and 2 in such a way that instead of sensors 11, switching flaps 12 are provided which are each assigned to a section 4. Said switching flaps 12 are actuated by the piece goods 10 and project into the path of movement of the same. The switching flaps 14 co-operate with sensors 11' which send control signals to a control unit (not shown). An actuated switching flap 12 (FIG. 4) makes a sensor 11' emit a signal.

As is shown in FIGS. 5 and 6, belt 5 is deflected by the press rollers 7 and the drive roller 6 in the zone of each drive roller 6 and encloses the same at an angle of approx. 20°.

As is shown in FIG. 7, the drivable and brakable roller 13 is provided with two circular grooves 14 in which belts 8 are guided which revolve around two adjacent support rollers 3. They are operatively connected by way of further belts 8 with further support rollers of the same section 4.

Figure 8:
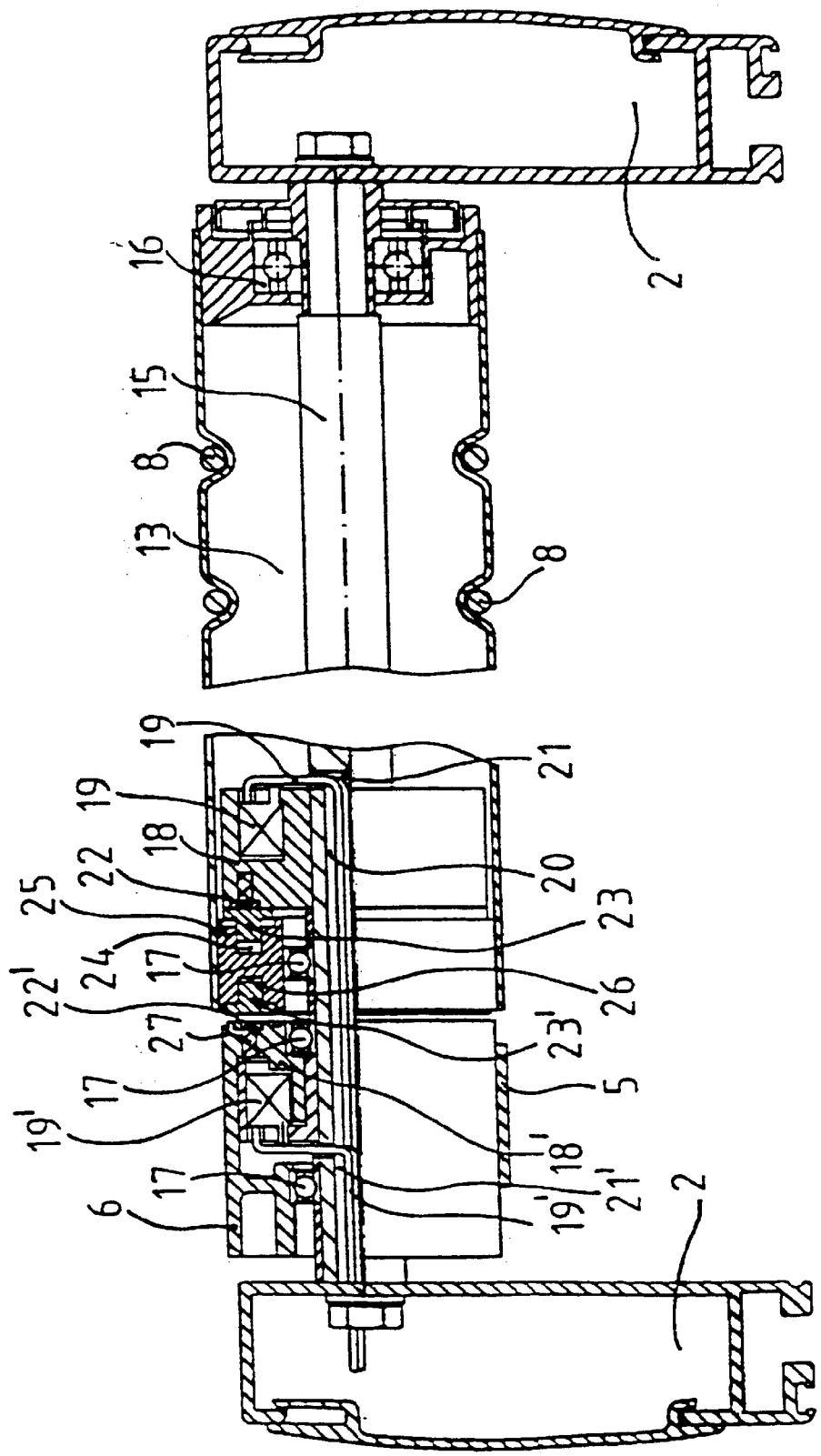
FIG. 8 shows a drivable and brakable roller in the braked position in a sectional view.
Figure 9:
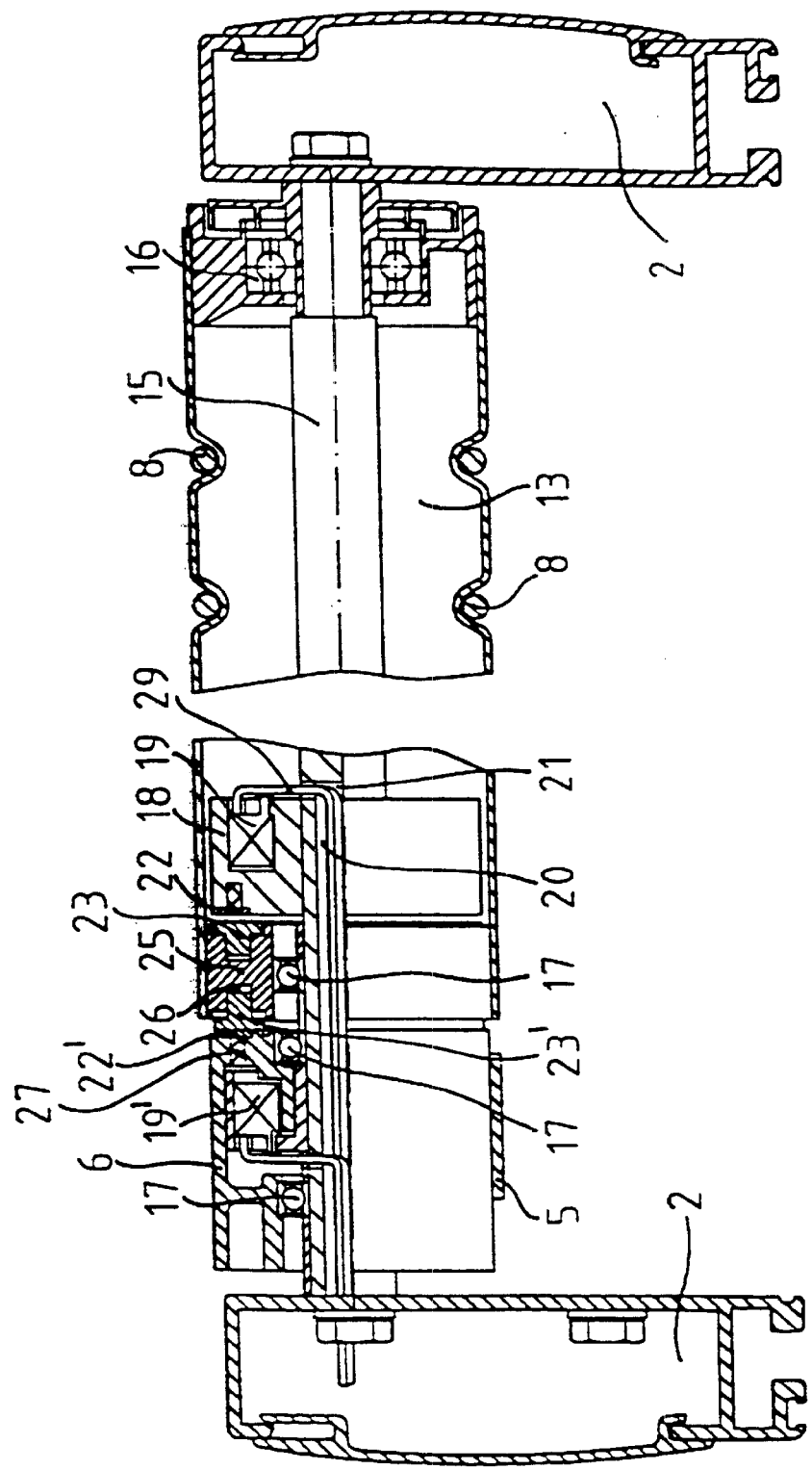
FIG. 9 shows a drivable and brakable roller in the engaged position in a sectional view.
Figure 10:
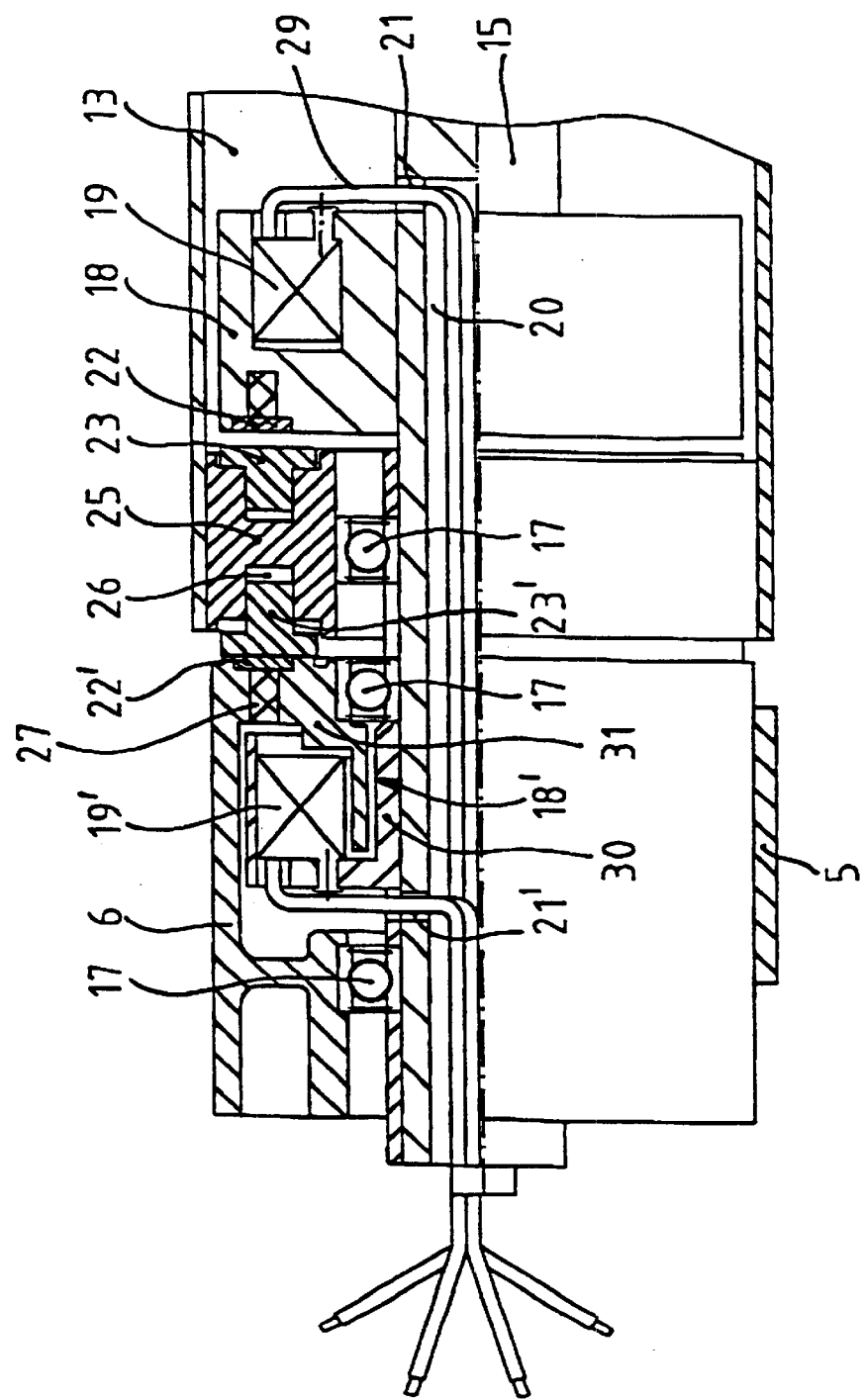
FIG. 10 shows an enlarged sectional view of the drive roller.

As is shown in FIGS. 8 and 9, axles 15 are held in frame 2 on which drivable and brakable rollers 13 and drive rollers 6 are held by way or roller bearings 16, 17.

A ring magnet 18 with an inserted coil 19 is provided in the drivable and brakable roller 13, which ring magnet is held in a torsionally rigid manner on the axle 15. The connecting wires of coil 19 are guided via an axial and radial bore 20, 21.

Ring magnet 18 is provided with a pole face which is provided with a friction lining 22, which pole face co-operates with an annular armature 23. Armature 23 is held on a toothing (not shown) extending in the axial direction, which toothing allows an axial movement of the armature 23.

Said toothing is incorporated in an annular groove 24 of an annular body 25 which is rigidly connected with the roller 13, which annular body rests rotatably on axle 15 via a bearing 17.

A further annular groove 26 is incorporated in the outer side of said annular body 25 in which a further armature 23' is held axially displaceable on an axial toothing, but rotationally rigidly in the annular body 25.

Said armature 23' co-operates with a ring magnet 18' which is arranged in the zone of the drive roller 6, which ring magnet is provided with a carrier part 30 which is rigidly held on the axle 15 and in which a coil 19' is held. The coil 19' of the ring magnet 18' is connected via connecting lines 19' which extend in the axial bore 20 and a radial bore 21' of axle 15.

Said annular carrier part 30 which is provided with a flange is overlapped by a magnetizable flux guide part 31 which is connected with the roller 6, which is made of a magnetizable material, via a non-magnetizable gap part 27 which is made of plastic for example, with an air gap remaining between the tube-like section of the carrier part and the flux guide part 31.

The flux guide part 31 is rotably supported on axle 15 with a ball bearing 17. As a result of the connection of the flux guide part 31 with the drive roller 6 via the gap part 27, the drive roller 6 is supported via two ball bearings 17.

At the face side which faces the drivable and brakable roller 13, the gap part 27 is covered with a friction lining 22'. The face sides of the drive roller 6 which face the drivable and brakable roller 13 and their flux guide parts 31 are used as pole faces with which the armature 23' held in annular body 25 co-operates.

In FIG. 8, the drivable and brakable roller 13 is shown in the braked position. In this process, the coil 19 of ring magnet 18 is excited, as a result of which armature 23 rests on the pole face of ring magnet 18 which is provided with a friction lining 22 and a respective frictional connection is produced between the ring magnet 18 which is rigidly connected with the axle and the armature 23 which is rotationally rigidly connected with the annular body 25 of roller 13. As a result, the roller 13 is connected with axle 15 by way of frictional connection and thus held tightly.

FIG. 9 shows a drivable and brakable roller 13 which is coupled with the drive roller 6. The coil 19' of the ring magnet 18' is excited, as a result of which the armature 23' rests on the pole faces of the drive roller 6 and its flux guide part 31. In this process there is a frictional connection between the frictional lining 22' and the armature 23' which is rotationally rigidly connected with the annular body 25 of the drivable and brakable roller 13.

The coil 19 of the ring magnet 18 which is arranged in the zone of the drivable and brakable roller 13 is not excited and thus the brake is thus released.

Depending on which coil 19, 19' of the coupling device or brake is excited, the drivable and brakable roller 13 can therefore be driven via drive roller 6 or be connected with axle 15 and thus be braked or blocked.

What is claimed is:

1. A roller conveyor comprising a frame, several sections of rollers held in the frame; each section comprising a plurality of support rollers, a drivable and brakable roller coupled to the support rollers, and a drive roller; a common axle rotatably supporting the drive roller and the drivable and brakable roller; a first switchable electromechanical clutch connecting the drivable and brakable roller to the drive roller; and a second switchable electromechanical clutch connecting the drivable and brakable roller to a braking drive.

2. The roller conveyor of claim 1, wherein the first electromechanical clutch comprises a ring magnet which is held non-rotationally on the axle and magnetizes the drive roller, a friction lining on a side of the drive roller facing the drivable and brakable roller, and an armature non-rotationally connected to the drivable and brakable roller and held axially displaceably thereon for contact with the friction lining.

3. The roller conveyor of claim 1, wherein the second electromechanical clutch comprises a ring magnet which is held non-rotationally on the axle and has a pole face provided with a friction lining, and an armature non-rotationally connected to the drivable and brakable roller and held axially displaceably thereon.

4. The roller conveyor of claim 1, comprising a common revolving drive belt driving the drive rollers of the several sections.

5. The roller conveyor of claim 1, comprising belts operatively connecting the drivable and brakable roller of each section of rollers with the support rollers thereof.

* * * * *

UNITED STATES PATENT AND TRADEMARK OFFICE
CERTIFICATE OF CORRECTION

PATENT NO.    : 6,471,043 B2
DATED         : October 29, 2002
INVENTOR(S)   : Schwingshandl et al.

It is certified that error appears in the above-identified patent and that said Letters Patent is hereby corrected as shown below:

<u>Title page,</u>
Item [75], the address of the last named inventor correctly should read:
-- Neiderwaldkirchen (AT) --.
Item [73], the address of the Assignee correctly should read:
-- Wels (AT) --.

Signed and Sealed this

Twenty-seventh Day of May, 2003

JAMES E. ROGAN
*Director of the United States Patent and Trademark Office*